(No Model.)
H. LALIBERTY.
STEAM WHEEL.
No. 306,842. Patented Oct. 21, 1884.
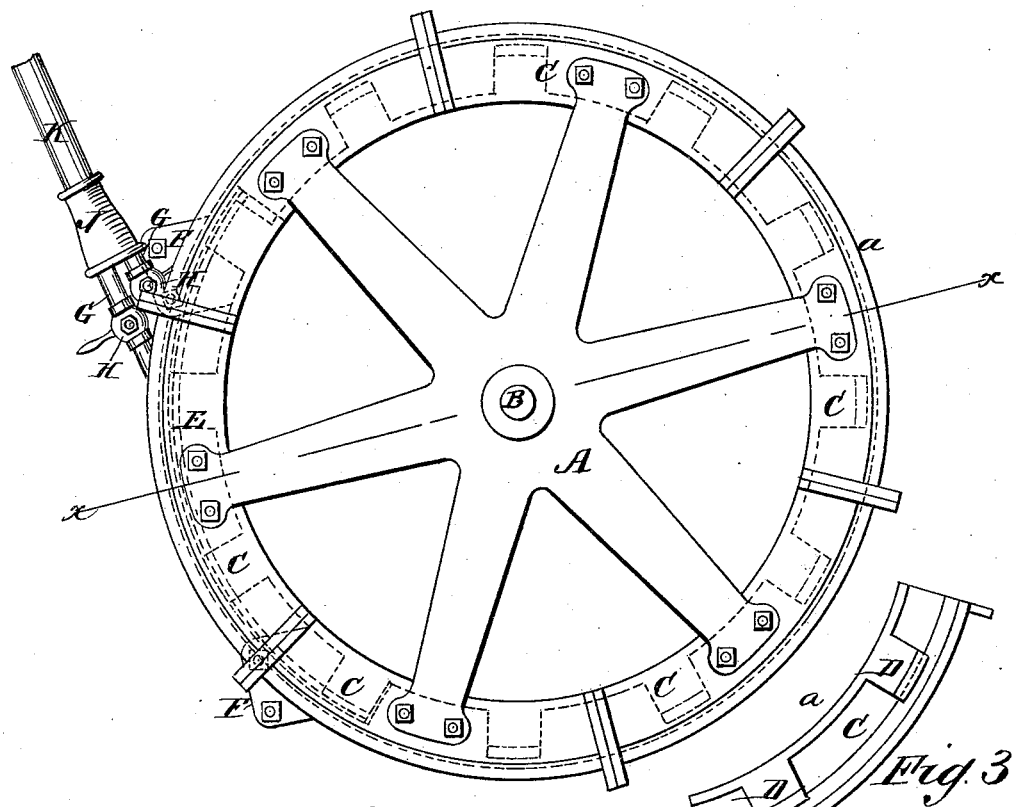
Fig. 1.
Fig. 3.
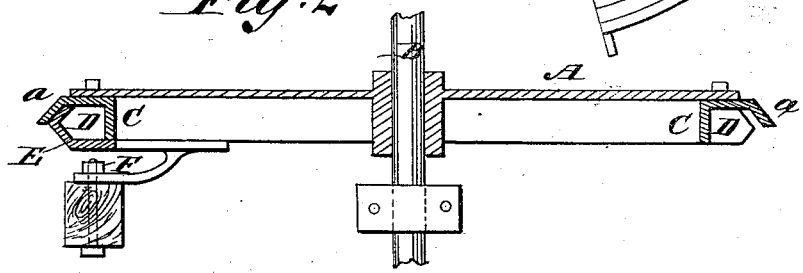
Fig. 2.
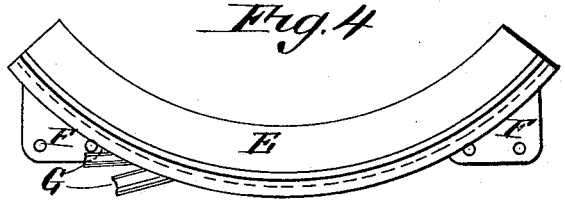
Fig. 4.
WITNESSES:
F. M. Ardle
C. Sedgwick
INVENTOR:
H. Laliberty
BY Munn & Co
ATTORNEYS.

UNITED STATES PATENT OFFICE.

HOMER LALIBERTY, OF PARK CITY, UTAH TERRITORY.

STEAM-WHEEL.

SPECIFICATION forming part of Letters Patent No. 306,842, dated October 21, 1884.

Application filed February 16, 1884. (No model.)

*To all whom it may concern:*

Be it known that I, HOMER LALIBERTY, of Park City, Summit county, Territory of Utah, have invented a new and Improved Steam-Wheel, of which the following is a full, clear, and exact description.

The object of my invention is to provide a simple and effective motor to be acted on by steam or air pressure; and it consists of a wheel having a hollow rim open at one side and containing a series of pistons fixed therein and adapted to slide through a segmental casing fitted to the rim and pistons and serving to confine the steam about the pistons.

My invention further consists in a double steam-nozzle for introducing steam to the segmental casing.

Reference is to be had to the accompanying drawings, forming a part of this specification, in which similar letters of reference indicate corresponding parts in all the figures.

Figure 1 is a side elevation of my improved steam-wheel. Fig. 2 is a transverse section taken on line $x\ x$, Fig. 1. Fig. 3 is a detail view of one of the segments of which the rim of the wheel is composed, and Fig. 4 is a view of the segmental casing.

The spider A, mounted on the shaft B, is attached to the hollow rim $a$. This rim is composed of segments C, fitted end to end and secured together by bolts or otherwise, each segment being secured centrally to an arm of the spider A. The side of the hollow rim $a$ contacting with the arms of the spider is parallel with the plane of the rotation of the wheel. The inner side of the rim is parallel with the axis of the wheel, the side remote from the spider-arms is open and the peripheral side is flared or beveled outward, and is only about half the width of the inner side. In the angle of the rim $a$ is secured a series of wings or pistons, D, having V-shaped outer ends. A segmental casing, E, having the same curvature as the rim $a$, and fitted to the plane and V-shaped sides of the pistons D, is provided with ears P, which support it in such relation to the rim $a$ as to form, in connection with the said rim, a closed curved chamber through which the pistons D may pass. The V-shaped outer edge of the segmental casing E passes between the beveled part of the rim $a$ and the pistons D, making a steam-tight joint. The segmental casing E is provided with a double nozzle consisting of two steam or air inlet pipes, G, each provided with a stop-valve, H, by which the amount of steam admitted is regulated. The pipes G receive steam through the connection J from the supply-pipe K. Steam or air impinging on the pistons D drives them forward in the segmental casing E, and when they arrive at the end of the said segment the steam or air escapes.

My improved wheel may be used with either steam, compressed air, or water as a propelling-power.

Having thus described my invention, I claim as new and desire to secure by Letters Patent—

1. In a steam-wheel, a rim closed on one side, open on the other, and provided with a series of pistons, in combination with a segmental casing adapted to the rim and to the pistons, and provided with one or more steam-supply pipes, as described.

2. A steam-wheel composed of a spider, A, rim $a$, open at one side, formed of sections C, and provided with pistons D, in combination with a segmental casing adapted to fit between the pistons and the flange of the wheel, as specified.

3. In a steam-wheel, the rim $a$, having a flared periphery, and provided with pistons having V-shaped outer ends, in combination with a segmental casing, E, having a V-shaped rim adapted to the pistons and to the flaring periphery of the rim $a$, as described.

4. The combination, with the segmental casing F, and wheel provided with the rim $a$, and piston D, of a double nozzle consisting of two steam-pipes, G, as specified.

HOMER LALIBERTY.

Witnesses:
ALFRED B. MULHALL,
JERRY COMBAW.